United States Patent
Belissent et al.

(10) Patent No.: US 6,865,594 B1
(45) Date of Patent: Mar. 8, 2005

(54) METHODS AND APPARATUS FOR AUTOMATICALLY GENERATING A ROUTING TABLE IN A MESSAGING SERVER

(75) Inventors: Jacques Belissent, Mountain View, CA (US); Fred Batty, Redwood City, CA (US); Timothy Misner, Palo Alto, CA (US); Daryl Huff, Saratoga, CA (US); Anil Srivastava, Redwood City, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/519,964

(22) Filed: Mar. 7, 2000

Related U.S. Application Data

(60) Provisional application No. 60/144,709, filed on Jul. 20, 1999.

(51) Int. Cl.[7] .................. G06F 15/16; G06F 15/173
(52) U.S. Cl. ............................... 709/206; 709/238
(58) Field of Search ............................ 709/206, 207, 709/220, 225, 238, 250

(56) References Cited

U.S. PATENT DOCUMENTS

| | | | |
|---|---|---|---|
| 5,263,157 A | | 11/1993 | Janis |
| 5,706,349 A | | 1/1998 | Aditham et al. |
| 5,751,791 A | | 5/1998 | Chen et al. |
| 5,765,033 A | | 6/1998 | Miloslavsky |
| 5,768,505 A | | 6/1998 | Gilchrist et al. |
| 5,835,727 A | | 11/1998 | Wong et al. |
| 5,884,046 A | | 3/1999 | Antonov |
| 5,913,210 A | * | 6/1999 | Call ............................ 707/4 |
| 5,920,697 A | * | 7/1999 | Masters et al. ............. 709/219 |
| 5,938,729 A | | 8/1999 | Cote et al. |
| 6,012,088 A | * | 1/2000 | Li et al. ...................... 709/219 |
| 6,131,095 A | * | 10/2000 | Low et al. .................... 707/10 |
| 6,154,738 A | * | 11/2000 | Call ............................ 707/4 |
| 6,163,805 A | | 12/2000 | Silva et al. |
| 6,175,832 B1 | | 1/2001 | Luzzi et al. |
| 6,199,062 B1 | * | 3/2001 | Byrne et al. ................. 707/3 |

OTHER PUBLICATIONS

International Search Report from Corresponding PCT Application PCT/US01/07097.
International Search Report from Corresponding PCT Application PCT/US01/07298.
Newton, H. Newton's Telecom Directory, Telecom Books, pp. 246–247, Oct., 1998.

* cited by examiner

Primary Examiner—Larry D. Donaghue
(74) Attorney, Agent, or Firm—Beyer Weaver & Thomas LLP

(57) ABSTRACT

According to the present invention, methods, apparatus, and computer readable medium are disclosed for automatically defining a mail domain in a directory server associated with a messaging server are disclosed. When an message having new domain name is received by the messaging server, a directory server creates a corresponding entry in a directory for every component included in the new domain name that does not already exist in the directory. A corresponding domain name service record is automatically updated in a domain name server associated with the directory server based upon the entry which is used to identify the new domain.

19 Claims, 8 Drawing Sheets

METHODS AND APPARATUS FOR AUTOMATICALLY GENERATING A ROUTING TABLE IN A MESSAGING SERVER

CROSS-REFERENCE TO RELATED APPLICATIONS

This application takes priority under 35 U.S.C. §119(e) of U.S. patent application Ser. No 60/144,709 filed Jul. 20, 1999 naming Daryl Huff, et al. as inventor(s) and assigned to the assignee of the present application which is also incorporated herein by reference for all purposes. This application is also related to the following U.S. Patent applications, which are filed concurrently with this application and each of which are herein incorporated by reference, (i) U.S. patent application Ser. No. 09/520,865 entitled "METHODS AND APPARATUS FOR MONITORING ELECTRONIC MAIL SYSTEMS" naming Kavacheri et al as inventors, now U.S. Pat. No. 6,557,036, (ii) U.S. patent application Ser. No. 09/521,282, entitled "METHODS AND APPARATUS FOR PROVIDING A VIRTUAL HOST ELECTRONIC MESSAGING SERVERS" naming Belissent et al as inventors, now U.S. Pat. No. 6,374,292, (iii) U.S. patent application Ser. No. 09/520,864, entitled "PRECEDENCE RULES IN ELECTRONIC MESSAGING SERVERS", naming Huff et al as inventors, and (iv) U.S. patent application Ser. No. 09/519,948, entitled "METHODS AND APPARATUS FOR DELEGATING ADMINISTRATIVE CAPABILITIES TO DOMAINS SERVED BY EMAIL PROVIDERS", naming Abbott et al as inventors, still pending.

FIELD OF THE INVENTION

The present invention relates in general to client/server data communication systems and, more particularly, to a mail server included in an electronic mail system for use within a client/server data processing system. More particularly still, the present invention is directed towards a method and apparatus that automatically provides a routing table for a new or modified domain associated with a particular mail server as well as providing user specific profiles useful in the disposition of email.

BACKGROUND OF THE INVENTION

Computer systems are well known in the arts and have become a business staple and are also found in many homes. One feature available to the business world is that of using electronic mailing (e-mail) to send and receive messages and other information to and from one another in a business setting. Similarly, home computers, such as desk tops or laptops, and other information devices, such as personal digital assistants (PDAs), allow telecommuting such that a user can connect to the user's work server and down load and upload messages.

The e-mail system allows clients of a network system, which is maintained by a server system, to send messages or data from one user to another. In order to minimize disk space and requirements as well as to maximize functionality and consistency of the electronic mailing engine used in the network system, the engine is typically located on the server and is merely accessed by a client in order to send messages or retrieve messages to or from another user or client on the server system. In this way, the client system typically allows the user to perform such operations as composing, updating, and sending messages while the server in such a system provides, in part, a server based message repository as well as providing message transmission and reception functions for the user at the client level.

Typically, in an intranet type email system 100 having a small number of users 102a through 102g as shown in FIG. 1, a mail server 104 uses what is referred to as a flat name space arrangement to store identification indicia (such as a domain name, mailbox number, etc.) that identifies each of the users 102a–102g. As is well known in the art, a flat name space requires that each of the users 102a–102g be identified by a unique name. In this way, no two users can have the same identification indicia since the server 104 would not be able to correctly identify which user a particular email message is destined. Clearly, while the flat name space arrangement may be suitable for small email systems, such as those typical of an intranet, it is unsuitable for larger, distributed systems having hundreds, thousands, or even hundreds of thousands of users.

One such large scale email system is described with reference to FIG. 2 showing an email system 200 suitable for large, distributed networks such as the Internet or large scale intranet systems. The system 200 typically includes a central mail server 202 resident in a computer system 204 that can take the form of a mainframe system as well as a distributed type computing system. In such large systems, the central mail server 202 is coupled to an interface, such as a firewall 206, that mediates the flow of information between the mail server 202 and its n client domains represented as domain$_1$, domain$_2$, and domain$_n$. As the number of client domains increases, it is inefficient to apply a flat name space arrangement as is commonly done in those small intranet type systems shown in FIG. 1. Additionally, the main server 202 logically segments portions of its computing resources into what are referred to as virtual mail servers each being associated with one of the n domains serviced by the mail server 202. In this way, each of the n domains appears to have their own mail server in the form of the associated virtual mail server. For example, the domain1 is associated with a virtual mail server VMS1, a domain2 with a virtual mail server VMS2, and so on.

Conventional approaches to implementing this type arrangement utilize a hierarchically structured domain name to identify the various domains serviced by the mail server 202.

As well known in the art, in the case of the Internet, a domain name locates an organization or other entity. For example, the domain name 'www.totalbaseball.com' locates an Internet address for "totalbaseball.com" at Internet point (IP) 199.0.0.2 and a particular host server named "www". The "com" part of the domain name reflects the purpose of the organization or entity (in this example, "commercial") and is called the top level domain name. The "totalbaseball" part of the domain name defines the organization or entity and together with the top-level is called the second level domain name. The second-level domain name maps to and can be thought of as the "readable" version of the Internet address. On the Web, the domain name is that part of the uniform resource locator or URL that tells a domain name server using the DNS (domain name system) whether and where to forward a request for a Web page. The domain name is mapped to an IP address that represents a physical point on the Internet.

However, even though a particular one of the domains is uniquely identified by its associated domain name, the mail server 202 must still be able to identify the proper destination of a received email and define a route from the server 202 to the identified end user. This identification is usually carried out by a directory services component 208 configured to provide directory services that typically take the form of an LDAP type directory. An LDAP (Lightweight Directory Access Protocol) is a software protocol for enabling anyone to locate organizations, individuals, and other resources such as files and devices in a network, whether on the Internet or on a corporate intranet. LDAP is a "lightweight" (smaller amount of code) version of DAP (Directory Access Protocol). In a network, a directory tells you where in the network something is located. On TCP/IP networks (including the Internet), the Domain Name System (DNS) is the directory system used to relate the domain name to a specific network address (a unique location on the network). However, you may not know the domain name. LDAP allows you to search for an individual without knowing where they're located.

An LDAP directory is organized in a simple "tree" hierarchy consisting of the following levels:

- The "root" directory (the starting place or the source of the tree), which branches out to
- Countries, each of which branches out to
- Organizations, which branch out to
- Organizational units (divisions, departments, and so forth), which branches out to (includes an entry for)
- Individuals (which includes people, files, and shared resources such as printers)

As well known in the art, an LDAP directory can be distributed among many servers such that an LDAP server is called a Directory System Agent (DSA).

Once the directory 208 has identified the particular domain for which an email is destined, the directory 208 uses a routing table 210, also referred to as a DNS table, to determine that appropriate path, or channel, that is to be used to deliver the particular email message. In this way, each mail server maintains a DNS table for each virtual mail server that maps incoming email to appropriate receiving mailbox. Typically, the mail server 202 builds a routing table based upon the corresponding DNS table that directs the email to the appropriate mailbox.

Unfortunately, however, every time a new domain is added, the mail server 202 has to create a new address rewrite rule (that are used to rewrite addresses into their proper or desired form as well as to determine to which channels a message should be enqueued) and configure the corresponding routing table that tells the mail server how to route email. In some cases, an email is sent to a new user before the routing table associated with the client's virtual mail server has been changed. In theses cases, the email cannot be delivered and an error message is returned stating that the addressee is unknown even though the intended receiver has in fact been added to the clients user list.

Therefore, it would be desirable to have an internet type email server capable of automatically updating any routing table based upon any changes occurring in the corresponding domain. In addition, it would be advantageous to have the capability of providing a user profile for each end user that identifies particular requirements of that user.

SUMMARY OF THE INVENTION

To achieve the foregoing, and in accordance with the purpose of the present invention, methods, apparatus, and computer readable medium for identifying, in a directory server, a new mail domain associated with an incoming email message that is received by a messaging server in a highly scalable mail server suitable for large scale distributed networks, such as the Internet, are provided. In accordance with one aspect of the present invention, a method of identifying, in a directory server, a new mail domain associated with an incoming email message that is received by a messaging server is disclosed. When a new domain name corresponding to the new domain is received by the messaging server, a corresponding entry is created in a directory in the directory server for every component included in the new domain name that does not already exist in the directory. Accordingly, a corresponding domain name service (DNS) record is automatically updated in a domain name server associated with the directory server based upon the entry which is used by the directory server to identify the new mail domain.

In another embodiment, an electronic messaging system is disclosed. The system includes a main host computer for transferring an incoming email message between a sending subscriber and a receiving subscriber that is identified by a receiving subscriber user name and corresponding receiving subscriber domain name. The system also includes a messaging server coupled to the main host computer for receiving the incoming email message from the sending subscriber and forwarding the incoming email message to the receiving subscriber. A directory server coupled to the main host computer that identifies for the messaging server a location of the receiving subscriber based upon the receiving subscriber user name and the receiving subscriber domain name. In those cases where the receiving subscriber domain is a new domain, the directory server creates a corresponding entry in a directory in the directory server for every component included in the new domain name that does not already exist in the directory. The directory server then automatically updates a corresponding domain name service (DNS) record that is, in turn, used by the directory server to identify the new domain.

In still another embodiment, computer-readable medium containing programming instructions for identifying, in a directory server, a new mail domain associated with an incoming email message that is disclosed. In a preferred embodiment, the computer-readable medium includes computer program code devices configured to cause a computer to receive a new domain name corresponding to the new domain by the messaging server and create a corresponding entry in a directory in the directory server for every component included in the new domain name that does not already exist in the directory. A corresponding domain name service (DNS) record in a domain name server associated with the directory server is automatically updated based upon the entry which is used to identify the new mail domain by the directory server.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
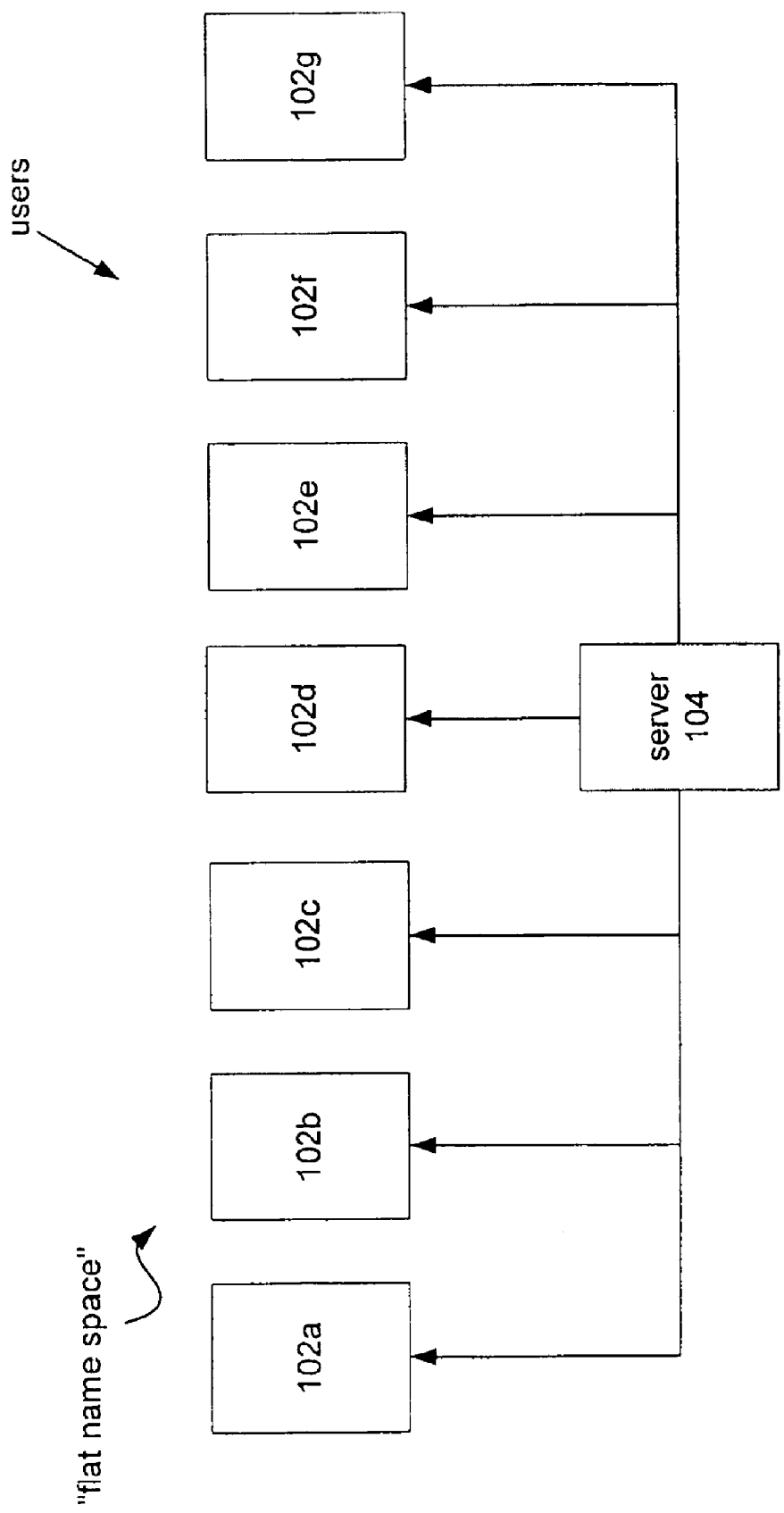
FIG. 1 illustrates a conventional e-mail system suitable for a small scale network.
Figure 2:
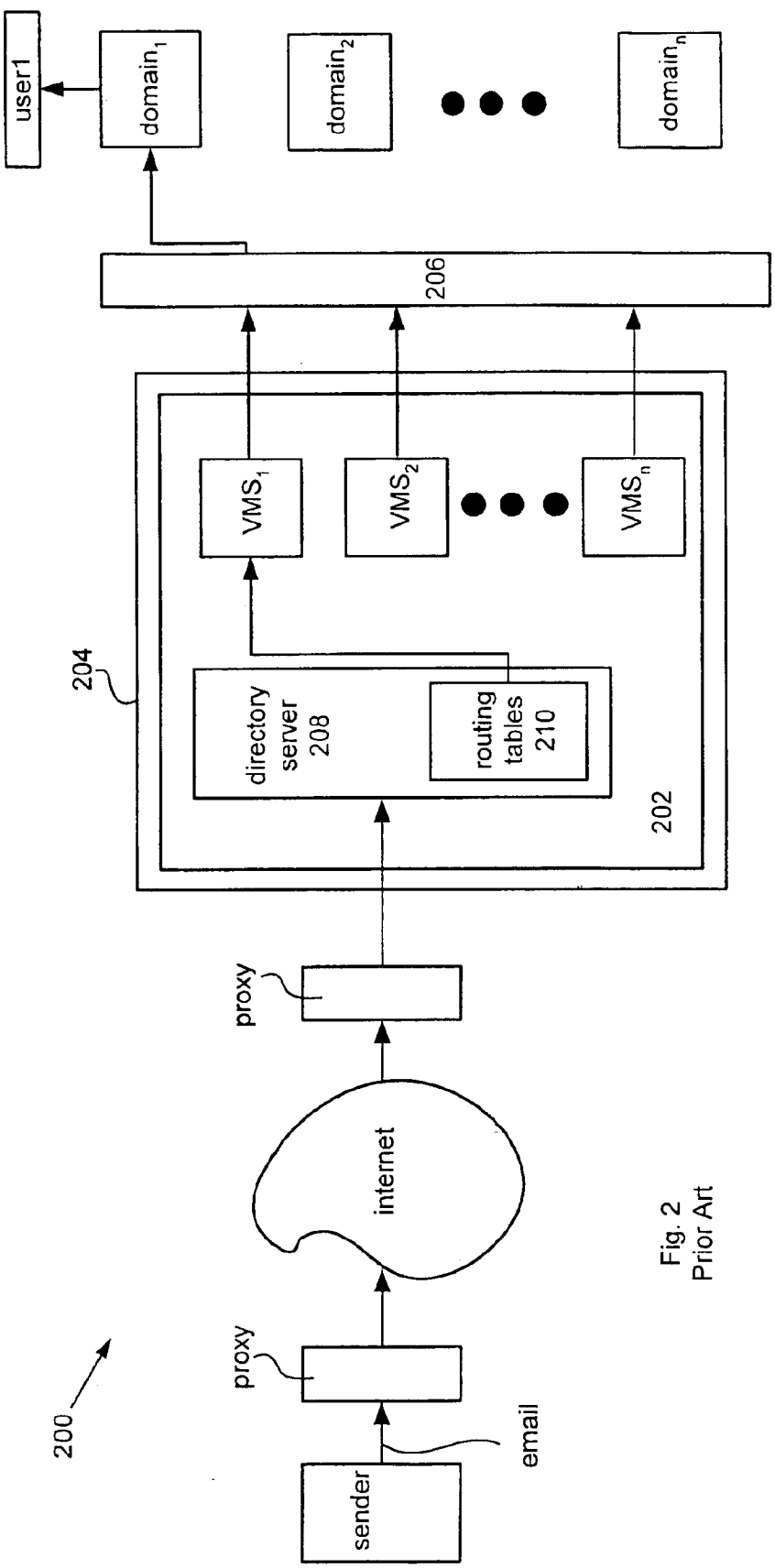
FIG. 2 illustrates a conventional e-mail system suitable for a large scale network such as the Internet.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

The Internet has effectively lowered the cost of electronic communication. As the number of people and organizations connected to the Internet has grown, the Internet has evolved into a new channel for communication. To facilitate Internet services, Internet messaging clients and easy-to-use web browsers have provided cost-effective way of publishing and sharing information with employees inside the enterprise as well as customers, suppliers, and partners outside. Since messaging services has become crucial to enterprise infrastructure in the 1990s, organizations are seeking messaging solutions that provide a lower cost of ownership while increasing the effectiveness and reliability of their communications network. Specifically, they are evaluating the benefits of Internet standards-based messaging systems.

Traditionally, messaging servers have relied upon directory servers to store information pertinent to mail users and groups. Part of this stored information is used by messaging servers to perform such tasks as message delivery and address verification.

Broadly speaking, in addition to email users and groups, the invention describes an Internet standards-based messaging system having a mail server capable of automatically updating routing tables based upon directory entries, that in some embodiments includes DNS table entries as well as MX records, to represent each domain served by all or part of the messaging server community. In particular, in one implementation, domain entries are used to build and maintain routing tables that tell messaging servers how messages should be transferred from server to server until they reach their final delivery point. In one embodiment, routing tables are generated from an LDAP directory structure. However, it should be noted that the generation of routing tables is not limited to the LDAP directory structure since the invention can be applied equally to the automatic generation of routing tables from DNS domain tables. In this way, the inventive messaging server is capable of using the MX (mail exchange) records within the DNS domain tables to automatically generate the corresponding routing tables.

The inventive messaging server also provides for specific user profiles suitable for uniquely specifying the disposition of any email placed in the corresponding user's mailbox.

The invention will now be described in terms of an internet mail server resident on a server computer coupled to a large network of mailboxes typical of a large corporate intranet system as well as a single user coupled to a large interconnected computer network such as the Internet. It should be noted, however, that the inventive mail server is well suited to any application requiring highly reliable, scalable, and efficient information transport over a large number of computers.

Figure 3:
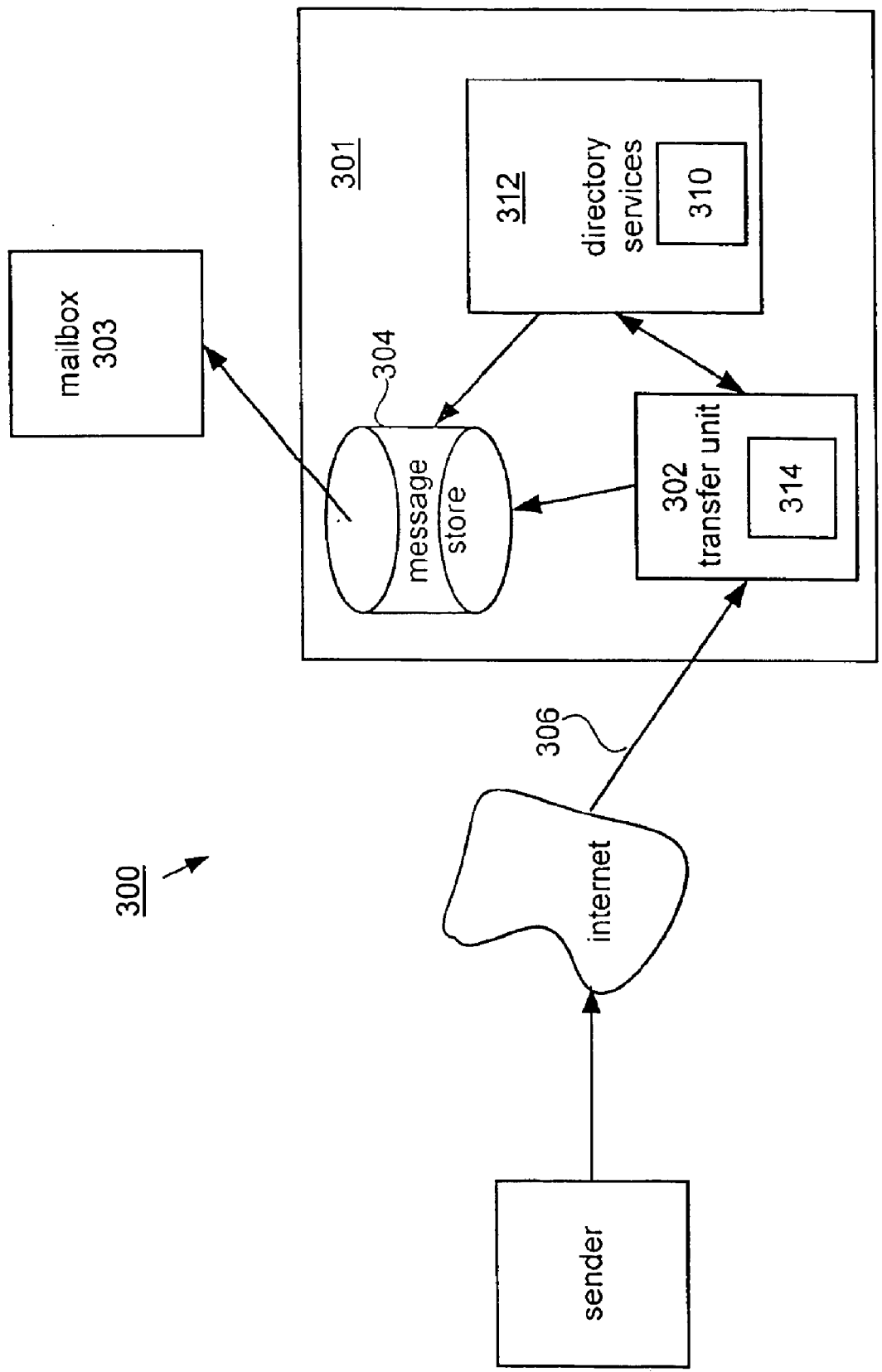
FIG. 3 shows an Internet email system in accordance with an embodiment of the invention

Referring now to FIG. 3, an Internet email system 300 in accordance with an embodiment of the invention includes an Internet mail server 301 coupled to a user mailbox 303. In the described embodiment, the mail server 301 is a general-purpose, "store-and-forward" system for distributing computer-based mail. It should be noted that the term "store-and-forward" means that the mail server 301 automatically handles the receiving of mail messages necessitated when network links (such as those links 306 to the Internet) or other services are temporarily unavailable. In contrast to mail user agents (MUAs) that are used to create and read electronic mail messages, a transfer unit 302 included in the mail server 301 is responsible for directing messages to the appropriate network transport and ensuring reliable delivery over that transport. In a preferred embodiment, the mail server 301 includes a message store unit 304 coupled to the transfer unit 302 that is used to store messages for later transmission to the user mailbox 303.

Figure 4:
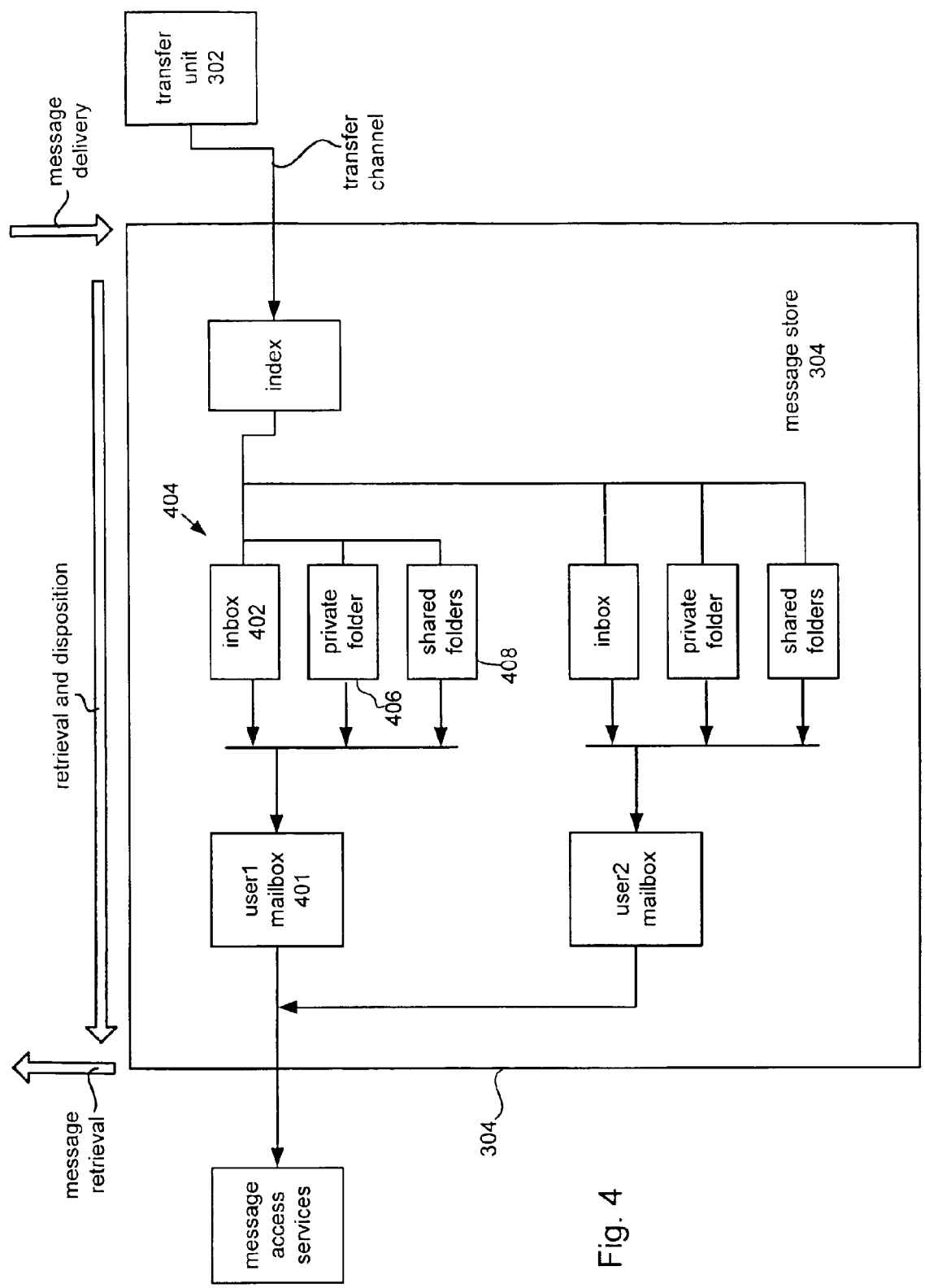
FIG. 4 shows an exemplary message store in accordance with an embodiment of the invention.

As shown in FIG. 4, in one implementation, the message store 304 in the mail server 301 is a dedicated data store for the delivery, retrieval, and manipulation of Internet mail messages. In a preferred embodiment, the message store works with the IMAP4 and POP3 to provide flexible and easy access to messaging. It saves any message that conforms to RFC 822 specifications, and recognizes the Multipurpose Internet Mail Extensions (MIME) content format.

In the described embodiment, the message store 304 is organized as a set of folders and user mailboxes. The mailbox 401 is a container for messages where each user has an inbox 402 where new mail arrives, and can have one or more folders 404 where mail can be stored. Folders 404 may contain other folders or mailboxes and may be arranged in a hierarchical tree. Mailboxes owned by an individual user are private folders 406. In addition to a user owning a folder or a mailbox, a common user or group can share the ownership of a folder or mailbox as a shared folder 408. A shared folder is similar to an email group, but instead of messages going into each member of the email group's inbox, messages addressed to the shared folder 408 go into a private folder associated with each user. It should be noted that in a preferred embodiment, the message store 304 maintains only one copy of each message. However, in those cases where the message store 304 receives a message addressed to multiple users or a group (based upon an associated distribution list), it adds a reference to the message in each user's inbox rather than having a copy of the message in each user's inbox, thereby saving disk space. In addition to the reference, the individual message's status (new, unread, replied to, deleted, and the like) is maintained per mailbox.

In the described embodiment, access to the message store 304 is multithreaded thereby allowing a single process to manage a large number of connections since each connection is handled by a thread. In this way, multithreaded access maximizes both performance and scalability by minimizing the system resources required for the management of each connection.

Referring back to FIG. 3, the delivery and routing of messages by the transfer unit 302 is based on a routing table 310 that in turn is derived from the user and group (distribution list) entries stored in a directory service unit 312. In a preferred embodiment, the directory service unit 312 is the central repository for meta-information: user profiles, distribution lists, and other system resources based upon, in some embodiments, a dedicated Lightweight Directory Access Protocol (LDAP) directory service. This directory supports the storage of information according to a directory information tree (DIT) which is a hierarchical structure that resembles a tree with one major branch at the top and many branches and sub-branches below. The arrangement of the tree is flexible, allowing administrators to decided how to best deploy the service for their organization. For some, it may be best to arrange the tree according the actual business organizational structure or geographic structure. For others, however, a one-to-one mapping to DNS layers may be best.

The DIT also provides the flexibility to support a wide range of administration scenarios, and can be administered in either a centralized or distributed manner. Centralized administration can be implemented where one authority manages the entire DIT. This type of administration is usually used in scenarios where the entire DIT resides on one mail server.

In order to properly route a message, the transfer unit 302 must access the directory information associated with each message that it processes. However, in a preferred embodiment, rather than querying the directory service 312 directly each time it processes a message, the transfer unit 302 caches the directory information in a directory cache 314. When the transfer unit processes a particular message, it accesses the appropriate directory information in the cache 314. When required, the transfer unit 302 uses the directory information in the cache 314 to update the routing table 312.

Since a directory query for each recipient of each message is time-consuming and puts a large load on the mail server 301, by implementing the localized directory cache 314, performance of the email server 301 is improved. In addition, since the information stored in the directory service unit 310 is not always in the format required by the transfer unit 302, when creating the cache, the transfer unit reformats the directory information as required.

It should be noted that in most embodiments, the transfer unit 302 can be configured to adhere to various mail delivery options which specify one or more delivery options for inbound email to a designated recipient. While inbound messages can be delivered into multiple message stores, message access servers (MAS) can read messages from only a designated one of them. The transfer unit 302 uses these attributes to determine the targets of message delivery for all messages submitted to a particular distribution list. Such attributes can include, but are not limited to: "autoreply", "program" where mail is delivered to a program, "forward" where mail is forwarded to another mailbox(es), "file" where the incoming message file is appended to another file, and "shared" where mail is delivered to a shared mailbox (this is typically used to set up a shared mailbox for a distribution list).

In the context of electronic mail, protocols are generally a high-level (not necessarily network specific) language spoken between two mailers. Transports are the low-level, network specific details used to implement a protocol on a given network. Thus email messages can come in to the transfer unit 302 by any one of a variety of transports and protocols—submitted directly by a local user, via TCP/IP as an SMTP message from an Internet system, by using a dial-up modem using the PhoneNet protocol, DECnet as a MAIL-11 message, DECnet as an SMTP message, UUCP, an X.400 transport, SNA, and so on. The transfer unit 302 then routes the message out using a transport and protocol appropriate for the message's destination address.

In the described embodiment, the transfer unit 302 uses what are referred to as channels to implement specific combinations of transports and protocols. Each different transport and protocol combination has an associated transfer unit channel. The transfer unit 302 postmaster initially configures the transfer unit 302 telling it what sorts of transports and protocols are in use at his site, and what sorts of destination addresses should be routed through which sorts of channels. For instance, at sites with an Internet connection, Internet addresses are normally routed through an SMTP over TCP/IP channel; but at sites with only a UUCP connection, Internet addresses would instead be routed through a TUCP channel. Once the transfer unit 302 is so configured using configuration data stored in a configuration table (not shown), the transfer unit 302 handles message routing and delivery automatically. In this way, ordinary users need never be aware of this underlying transport and routing; that is, they simply address and send their messages and the transfer unit 302 automatically routes and delivers them appropriately.

In most embodiments, the transfer unit 302 stores messages as text files. Messages with multiple parts (possibly containing different types of data) are represented as a series of text sections separated by special unique delimiter strings. In the described embodiment, the first few files in each email message are referred to as the message envelope that contains transport information. The message envelope is terminated by a line containing a boundary marker, or by a line containing two CTRL/A characters. The transfer unit 302 uses the contents of the envelope to make routing decisions. It does not use the content of the message. The content of the envelope is primarily defined by RFC 821. It includes the originator address, the recipient(s) address(es), and envelope ID.

The header lines of the message follow the envelope whose format is mandated by RFC 822. It should be noted that there may be any number of message header lines; the message header formed by this collection of header lines is terminated by a single A, blank line after which follows the message body. An Internet mail message starts with one or more headers. Each header is composed of a field name followed by a colon then a value which can be generated by, for example, the composer of a message or the mail client. A transfer unit can also add headers to a message. Each transfer unit that accepts a message adds a received header to that message. The last transfer unit to accept the message and to actually deliver the message to the message store adds a return-path header. The received and return-path headers provides information that enables you to trace the routing path taken by the message if a problem occurs.

Submitted messages from the Internet or local clients go to the transfer unit 302 via SMTP (Simple Mail Transport Protocol). If the message address is within the server 302 domain, the transfer unit 302 delivers the message to the message store 304. If, however, the message is addressed to another domain, the transfer unit 302 relays the message to another transport agent on the Internet or Intranet.

In a preferred embodiment, messages to the local domain are stored in the message store 304 depending on how the system is configured. Once messages are delivered to the appropriate mailbox, they can be retrieved, searched for, and manipulated by IMAP4 or POP3-based mail clients. The transfer unit 302 uses the directory 312 that, in a preferred embodiment, is configured as an LDAP type directory, to retrieve local user and group address information. When the transfer unit 302 receives a message, it uses the directory information to determine where the message should be delivered. The message store uses the directory services to authenticate users logging into their mailboxes. The message store 304 also obtains information about user message quota limits and message store type (IMAP or POP). Outgoing client messages go to the SMTP channel in the LDAP. The transfer unit 302 sends the message to an Internet transfer or, if the address is local, to the message store 304.

Figure 5:
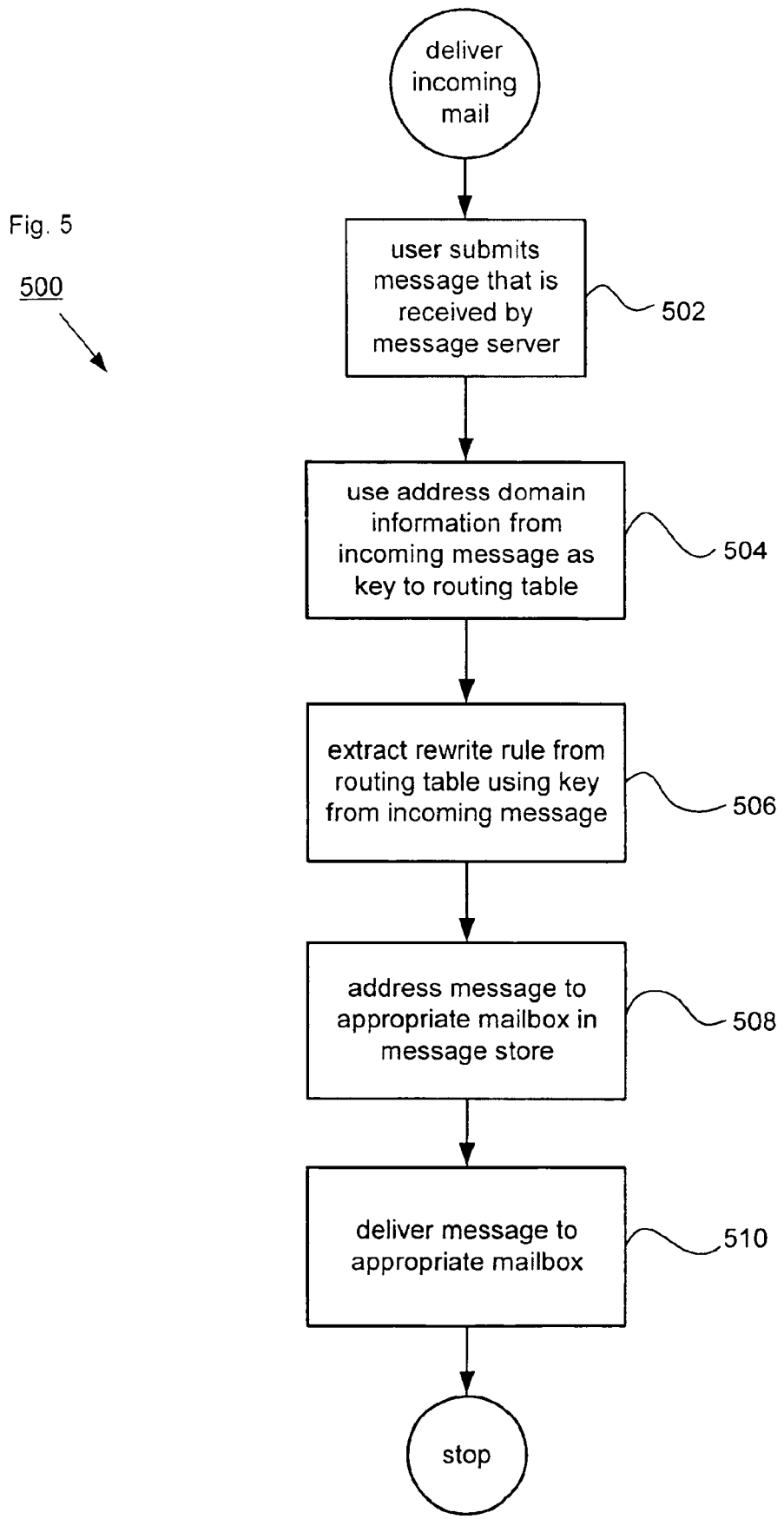
FIG. 5 shows a flowchart that details a process that describes a message data flow in accordance with an embodiment of the invention.

Referring now to FIG. 5 showing a flowchart that details a process 500 that describes a message data flow in accordance with an embodiment of the invention. The process 500 starts at 502 by the user submitting a message to be delivered to another user on the network via the SMTP protocol. At 504, the transfer unit reads the address and the routing information from the directory service server using the address domain information from the incoming message as a key. Using the address domain information from the incoming message, the transfer unit determines delivery information from the address and domain rewriting rules by consulting the directory cache at 506. Next at 508, based upon the routing information, the transfer unit sends the message to the receiving end where, if necessary, a receiving transfer unit reads the address and looks up the host and mailbox information in the directory services server for the receiving client. If the message address is within the server's domain, the receiving transfer unit delivers the message to the message store. If, however, the message is addressed to another domain, the receiving transfer unit relays the message to another transport agent on the Internet or Intranet. Finally at 510, the user can now retrieve the message or delete it.

Figure 6:
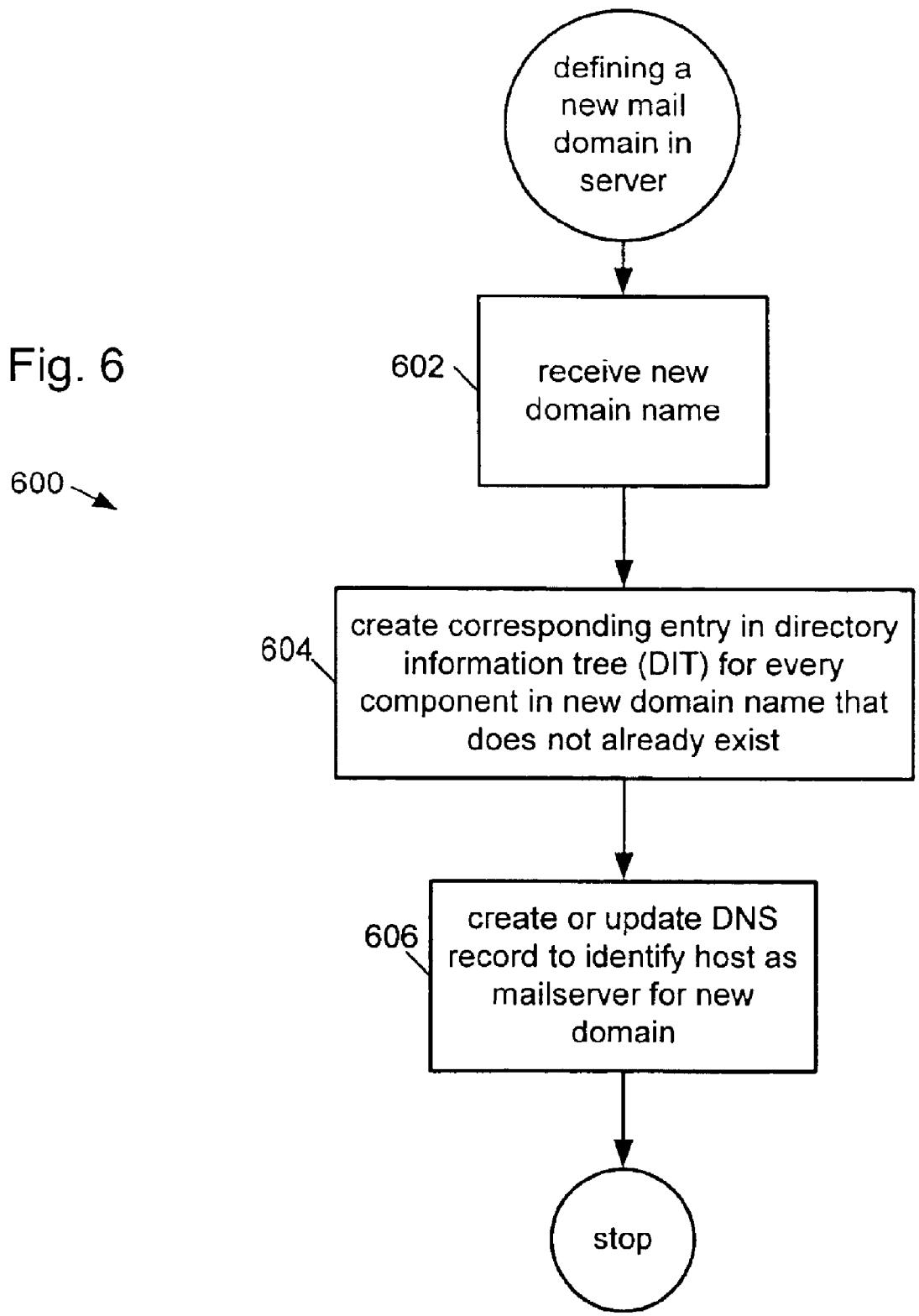
FIG. 6 shows a flowchart detailing a process whereby a new mail domain is defined in accordance with an embodiment of the invention.

In those instances where either a new domain has been created or an existing domain has been updated, a new mail domain must be defined in the mail server based upon a process 600 detailed by the flowchart shown in FIG. 6. The process 600 begins at 602 by the mail server receiving the new domain name. Next, at 604, a corresponding entry is made in the directory information tree (DIT) for every component in the new domain name that does not already exist. At 606, a corresponding DNS record is either updated or created in order to identify the host server as the mail server for the new domain.

In a preferred embodiment, the directory information stored in the directory service is continuously updated. As a result, the directory information in the directory cache must be updated periodically with the current directory information in the directory service in a procedure referred to as synchronization. In the described embodiment, there are at least two types of synchronization, namely full synchronization and incremental synchronization.

With full synchronization, the existing cache is replaced with a new cache, completely rebuilt with the current user and group entries from the directory service. After the synchronization occurs, the transfer unit's configuration file is rebuilt then the transfer unit is automatically restarted. With incremental synchronization, the existing cache is updated with user and group entries that were created or modified since the last full or incremental synchronization. With incremental synchronization, the transfer unit is not restarted.

Accordingly, Table 1 outlines the updates to the directory cache that are and are not performed during a full synchronization and an incremental synchronization.

TABLE 1

Updates Performed During Full/Incremental Synchronization

| Transfer Unit-Directory Cache Update | Performed During Full Synchronization? | Performed During Incremental Synchronization? |
|---|---|---|
| New user entries added | Yes | Yes |
| Modified user entries updated | Yes | Yes |
| Deleted user entries removed | Yes | No |
| New members added to existing distribution lists | Yes | Yes |
| Deleted members removed from existing distribution lists | Yes | Yes |
| Modification of access control info | Yes | No |
| New distribution lists added | Yes | Yes |
| Deleted distribution lists removed | Yes | Yes |

Figure 7:
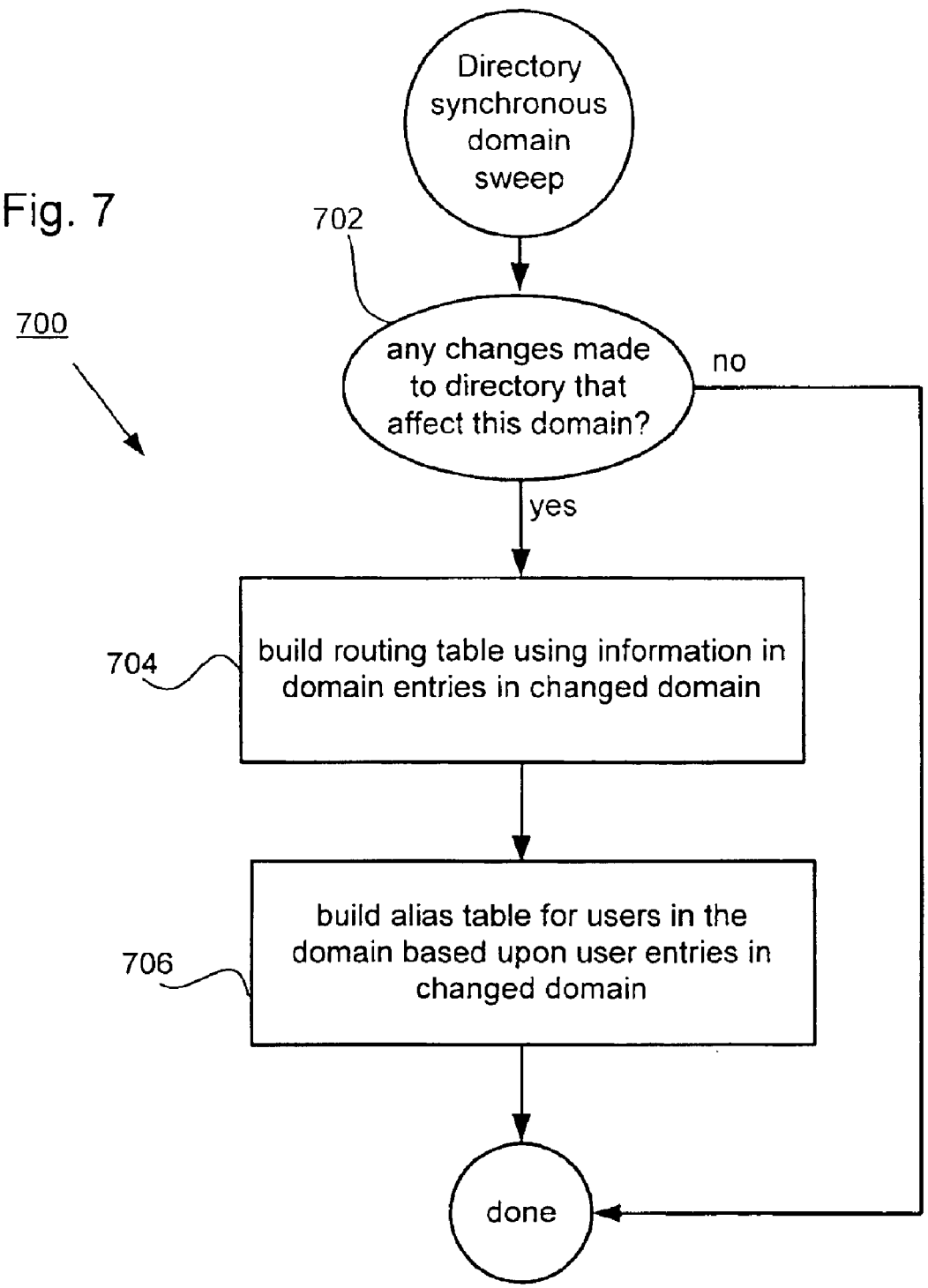
FIG. 7 illustrates a flowchart detailing a process for synchronizing the directory cache for a particular domain in accordance with an embodiment of the invention.

Referring now to FIG. 7 illustrating a flowchart detailing a process 700 for synchronizing the directory cache for a particular domain in accordance with an embodiment of the invention. The process 700 begins at 702 by a determination if any changes have been made to the directory that affects the particular domain. If it is determined that there have been no affective changes, then processing stops. Otherwise, a new routing table is built at 704 using information in the domain entries in the changed domain. Finally, at 706, an alias table is built for users in the domain that is based upon user entries in the changed domain.

Figure 8:
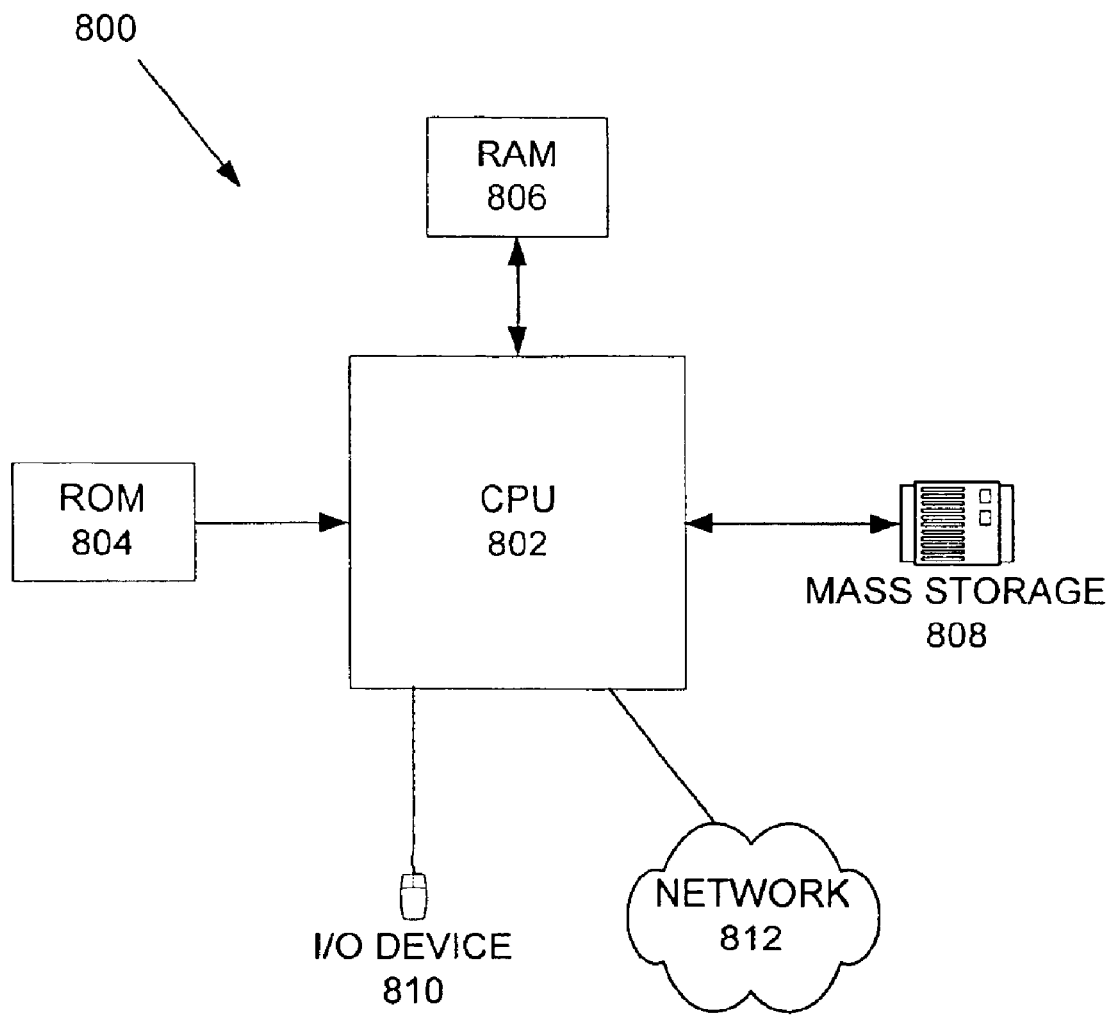
FIG. 8 illustrates a typical, general-purpose computer system suitable for implementing the present invention.

FIG. 8 illustrates a typical, general-purpose computer system 800 suitable for implementing the present invention. The computer system 800 includes any number of processors 802 (also referred to as central processing units, or CPUs) that are coupled to memory devices including primary storage devices 804 (typically a read only memory, or ROM) and primary storage devices 806 (typically a random access memory, or RAM).

Computer system 800 or, more specifically, CPUs 802, may be arranged to support a virtual machine, as will be appreciated by those skilled in the art. One example of a virtual machine that is supported on computer system 800 will be described below with reference to FIG. 8. As is well known in the art, ROM acts to transfer data and instructions uni-directionally to the CPUs 802, while RAM is used typically to transfer data and instructions in a bi-directional manner. CPUs 802 may generally include any number of processors. Both primary storage devices 804, 806 may include any suitable computer-readable media. A secondary storage medium 808, which is typically a mass memory device, is also coupled bi-directionally to CPUs 802 and provides additional data storage capacity. The mass memory device 808 is a computer-readable medium that may be used to store programs including computer code, data, and the like. Typically, mass memory device 808 is a storage medium such as a hard disk or a tape which generally slower than primary storage devices 804, 806. Mass memory storage device 808 may take the form of a magnetic or paper tape reader or some other well-known device. It will be appreciated that the information retained within the mass memory device 808, may, in appropriate cases, be incorporated in standard fashion as part of RAM 806 as virtual memory. A specific primary storage device 804 such as a CD-ROM may also pass data uni-directionally to the CPUs 802.

CPUs 802 are also coupled to one or more input/output devices 810 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 802 optionally may be coupled to a computer or telecommunications network, e.g., an Internet network or an intranet network, using a network connection as shown generally at 812. With such a network connection, it is contemplated that the CPUs 802 might receive information from the network, or might output information to the network in the course of performing the above-described method steps. Such information, which is often represented as a sequence of instructions to be executed using CPUs 802, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, operations involved with synchronizing a directory cache may be reordered. Operations may also be removed or added without departing from the spirit or the scope of the present invention.

Although the methods defining new routing tables in a messaging server in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

While the present invention has been described as being used with a computer system that has an associated virtual machine, it should be appreciated that the present invention may generally be implemented on any suitable object-oriented computer system. Specifically, the methods of defining a new or updated routing table in accordance with the present invention may generally be implemented in any multi-threaded, object-oriented system without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. A method of identifying, in a directory server, a new mail domain associated with an incoming message that is received by a messaging server, comprising:
   receiving a new domain name associated with the incoming message at the messaging server;
   creating a corresponding entry in a directory in the directory server for every component included in the new domain name that does not already exist in the directory;
   automatically updating a corresponding real domain service record in a domain name server associated with the directory server based upon the entry; and
   identifying the new mail domain by the directory server based upon the automatically updated real domain record.

2. A method as recited in claim 1, further comprising:
   automatically generating a routing table based upon the created entry.

3. A method as recited in claim 2, wherein the identifying is also based upon the automatically generated routing table.

4. A method as recited in claim 3, wherein the messaging server includes a transfer unit that uses the automatically generated routing table to open a channel by which the incoming message is delivered.

5. A method as recited in claim 4, wherein the transfer unit includes a local directory cache used to store most recently used directory entries thereby reducing traffic between the messaging server and the directory server.

6. A method as recited in claim 5, wherein the local directory cache is periodically updated (synchronized) whenever the directory server has been updated.

7. A method as recited in claim 6, wherein the directory is a hierarchically organized directory.

8. A method as recited in claim 7, wherein the hierarchically organized directory is an LDAP based directory information tree (DIT).

9. A method as recited in claim 1, wherein the creating is based upon a mail exchange record (MX) associated with the incoming email message.

10. An electronic messaging system having a main host computer for transferring an incoming email message between a sending subscriber and a receiving subscriber wherein the receiving subscriber is identified by a receiving subscriber user name and corresponding receiving subscriber domain name, comprising:
    a messaging server coupled to the main host computer suitably arranged to receive the incoming message from the sending subscriber and forward the incoming message to the receiving subscriber; and
    a directory server coupled to the main host computer that identifies for the messaging server a location of the receiving subscriber based upon the receiving subscriber user name and the receiving subscriber domain name, wherein when the receiving subscriber domain is a new domain, the directory server creates a corresponding entry in a directory in the directory server for every component included in the new domain name that does not already exist in the directory, and wherein the directory server then automatically updates a corresponding real domain name record that is, in turn, used by the directory server to identify the new domain.

11. An electronic messaging system as recited in claim 10, wherein the messaging server automatically generates a routing table based upon the created entry.

12. An electronic messaging system as recited in claim 11, wherein the DNS record is updated based upon a mail exchange (MX) record associated with the incoming message.

13. An electronic messaging system as recited in claim 12, wherein the messaging server includes a transfer unit that uses the automatically generated routing table to open a channel by which the incoming message is forwarded to the receiving subscriber.

14. A computer-readable medium containing programming instructions for identifying, in a directory server, a new domain associated with an incoming message that is received by a messaging server, the computer-readable medium comprising computer program code devices configured to cause a computer to execute the operations of:
    receiving a new domain name corresponding to the new domain by the messaging server;
    creating a corresponding entry in a directory in the directory server for every component included in the new domain name that does not already exist in the directory;

automatically updating a corresponding real domain server record in a domain name server associated with the directory server based upon the entry; and identifying the new mail domain by the directory server based upon the automatically updated real domain record.

15. A computer-readable medium as recited in claim 14 wherein the computer program code devices configured for identifying, in a directory server, a new domain associated with an incoming message that is received by a messaging server further includes computer program code devices configured to cause a computer to execute the operations of:

automatically generating a routing table based upon the created entry.

16. A computer-readable medium as recited in claim 15 wherein the computer program code devices configured for identifying, in a directory server, a new domain associated with an incoming message that is received by a messaging server further includes computer program code devices configured to cause a computer to execute the operation of the identifying is also based upon the automatically generated routing table.

17. A computer-readable medium as recited in claim 16 wherein the computer program code devices configured for identifying, in a directory server, a new domain associated with an incoming message that is received by a messaging server further includes computer program code devices configured to cause a computer to execute the operation of using the automatically generated routing table to open a channel by which the incoming message is delivered by a transfer unit incorporated into the messaging server.

18. A computer-readable medium as recited in claim 17 wherein the computer program code devices configured for identifying, in a directory server, a new domain associated with an incoming message that is received by a messaging server further includes computer program code devices configured to cause a computer to execute the operation of storing the most recently used directory entries in a local directory cache thereby reducing traffic between the messaging server and the directory server.

19. A computer-readable medium as recited in claim 18 wherein the computer program code devices configured for identifying, in a directory server, a new domain associated with an incoming message that is received by a messaging server further includes computer program code devices configured to cause a computer to execute the operation periodically updating (synchronizing) the local directory cache whenever the directory server has been updated.

* * * * *